United States Patent [19]

Tohjo et al.

[11] Patent Number: 5,845,860
[45] Date of Patent: Dec. 8, 1998

[54] TAPE CARTRIDGE

[75] Inventors: Takehiko Tohjo; Hidetoshi Watanabe, both of Tochigi-ken, Japan

[73] Assignee: Kao Corporation, Tokyo, Japan

[21] Appl. No.: 968,450

[22] Filed: Nov. 12, 1997

[30] Foreign Application Priority Data

Nov. 15, 1996 [JP] Japan .................................. 8-305230

[51] Int. Cl.⁶ .................................................. G03B 1/56
[52] U.S. Cl. ......................................... 242/348; 242/332.4
[58] Field of Search .............................. 242/332.4, 348, 242/348.3

[56] References Cited

U.S. PATENT DOCUMENTS

| | | | |
|---|---|---|---|
| 1,655,297 | 1/1928 | Thornton | 242/332.4 |
| 3,293,682 | 12/1966 | Giles | 242/332.4 |
| 3,594,512 | 7/1971 | Castagna | 242/332.4 |
| 3,836,096 | 9/1974 | Fukushima et al. | 242/348.3 |
| 3,860,957 | 1/1975 | Imanishi et al. | 226/196.1 |
| 3,934,840 | 1/1976 | Inaga | 242/332.4 |
| 4,164,604 | 8/1979 | Tamai et al. | 48/409 |
| 4,328,066 | 5/1982 | Kiuchi et al. | 156/506 |
| 4,572,460 | 2/1986 | Hertrich | 242/332.4 |
| 4,662,049 | 5/1987 | Hertrich | 29/267 |
| 4,720,913 | 1/1988 | Hertrich | 242/332.4 |
| 4,732,799 | 3/1988 | Sakamoto et al. | 428/141 |
| 4,767,079 | 8/1988 | Saito et al. | 242/336 |
| 5,332,173 | 7/1994 | Kubota et al. | 242/348.3 |

*Primary Examiner*—John P. Darling
*Attorney, Agent, or Firm*—Oblon, Spivak, McClelland, Maier & Neustadt, P.C.

[57] ABSTRACT

A tape cartridge 1 including a cartridge body 2 including an upper half 2a and a lower half 2b, a magnetic tape 20 with a distal end being continuous with a leader tape 10, and a single tape reel 3 having the magnetic tape 20 taken up thereon and rotate-ably received within the cartridge body 2, wherein a thickness t2 of the leader tape 10 at an end edge portion 12 of a connecting portion 11 thereof connected to the magnetic tape 20 is larger than eight times but less than or equal to twenty times a thickness t1 of the magnetic tape 20.

5 Claims, 2 Drawing Sheets

TAPE CARTRIDGE

BACKGROUND OF THE INVENTION

1. Field of the Invention

This invention relates to a tape cartridge used for a data storage, or the like, which is used as a backup device of a computer, or the like, and more particularly to a tape cartridge which can fulfill the requirements for high capacity/high density and has a leader tape with sufficient strength.

2. Description of Related Art

A tape cartridge for a data storage which is used as a backup device of a computer is well known as disclosed, for example, in JP-T-62-502641. As shown in FIG. 1, a tape cartridge is proposed in this Publication, which comprises a cartridge body 2 including an upper half 2a, and a lower half 2b, and a single tape reel 3 including a disc-like upper flange 3a and a disc-like lower flange 3b, the tape reel 3 having a magnetic tape 20 taken up on it and received within the cartridge body 2 such that the tape reel 3 is constantly biased towards the lower half 2b by a reel spring 4 comprising a coiled spring.

The tape reel 3 includes the upper flange 3a and the lower flange 3b. A magnetic tape 20 with a leader tape 10 continuous therewith is taken up on a hub (not shown) provided on the upper flange 3a. The leader tape 10 and the magnetic tape 20 are integrally connected together at a connecting portion (not shown) through a splicing tape (not shown).

This tape reel 3 includes a ring-like bearing (not shown) which is fixedly press-fitted in a circular recess formed in a central portion of the upper flange 3a. A reel rotation supporting shaft (not shown) is attached to the bearing such that the tape reel 3 is rotated about the reel rotation supporting shaft.

By the way, in accordance with a requirement of recent years for high capacity/high density, there is a tendency towards such a movement that a base film of the magnetic tape is reduced in thickness by using, as a material thereof, polyamide (PA) or PEN (polyethylene naphthalate) having an increased strength in lieu of polyethylene terephthalate (PET) which has heretofore been used. For this reason, the leader tape is also demanded to have an increased strength in match with the tendency towards a thinner magnetic tape. However, since the leader tape is designed such that a force is applied thereto when it is drawn out, its distal end portion is required to have a sufficient strength. It is, therefore, a present status that the distal end portion of the leader tape is increased in thickness to ensure a sufficient strength.

Also, heretofore, the leader tape has been made of highly stretchable PET. In such a leader tape made of PET, however, when the magnetic tape is reduced in thickness, a dropout occurs due to a difference in thickness transferred (i.e., tape twisting) to the magnetic tape caused by the stepped portion at the connecting portion because a repulsive force of the leader tape generated, when the magnetic tape is taken up on a drive tape reel, is increased as the curvature of the tape thus taken up is increased.

As disclosed in JP-T-62-502641, the tape cartridge is used in a tape drive unit. Specifically, the leader tape and the magnetic tape are taken up on the drive tape reel of the data drive unit. At that time, data are simultaneously recorded on the magnetic tape for use.

In short, in the conventional tape cartridge, since the leader tape is not met with the thinner design of the magnetic tape, the requirement for high capacity/high density is not sufficiently fulfilled under the present circumstance.

SUMMARY OF THE INVENTION

It is, therefore, an object of the present invention to provide a tape cartridge, which includes a thin magnetic tape, and in which a leader tape has a sufficient strength, a smaller or no stepped portion is formed at the connecting portion between the leader tape and the magnetic tape, a smaller dropout occurs, and the requirement for high capacity/high density can be fulfilled.

After extensive search and development carried by the present inventors, they have found out that the above object can be achieved by a tape cartridge having a particular thickness of a connecting end portion of a leader tape.

The present invention has been made based on the above-mentioned finding. According to the present invention, there is provided a tape cartridge comprising a cartridge body including an upper half and a lower half, a magnetic tape with a distal end being continuous with a leader tape, and a single tape reel having the magnetic tape 20 taken up thereon and rotatably received within the cartridge body, wherein a thickness t2 of the leader tape at an end edge portion of a connecting portion thereof connected to the magnetic tape is larger than eight times but less than or equal to twenty times a thickness t1 of the magnetic tape.

A tape cartridge of the present invention includes a thin magnetic tape. The leader tape has a sufficient strength. The connecting portion between the leader tape and the magnetic tape has a less stepped portion, a dropout is less occurred, and the requirement for high capacity/high density can be fulfilled.

DETAILED DESCRIPTION OF THE EMBODIMENT

One embodiment of a tape cartridge according to the present invention will be described next with reference to the drawings.

Figure 1:
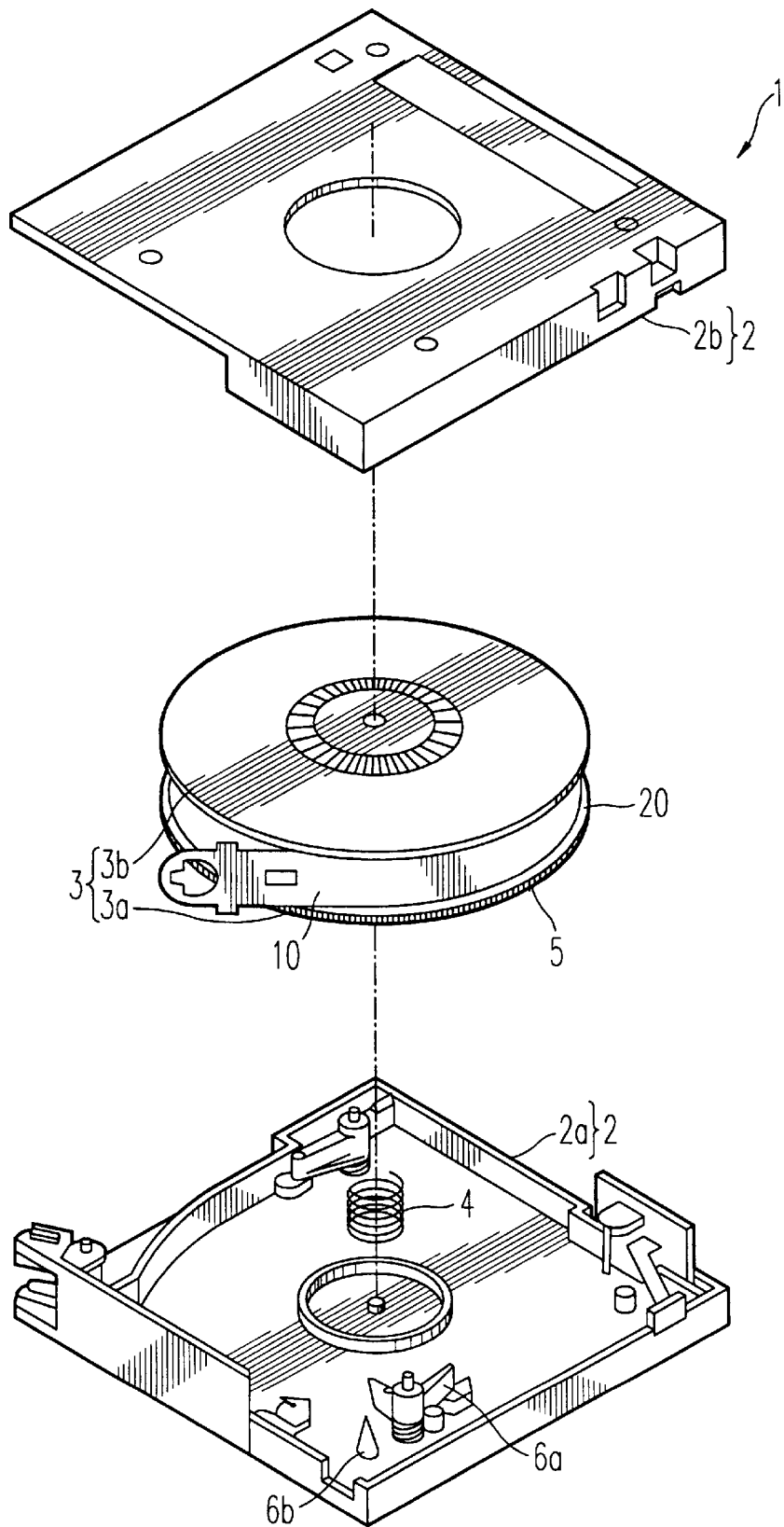
FIG. 1 is an exploded perspective view showing one embodiment of a tape cartridge according to the present invention (FIG. 1 also serves as an exploded perspective view showing a conventional tape cartridge)
Figure 2:
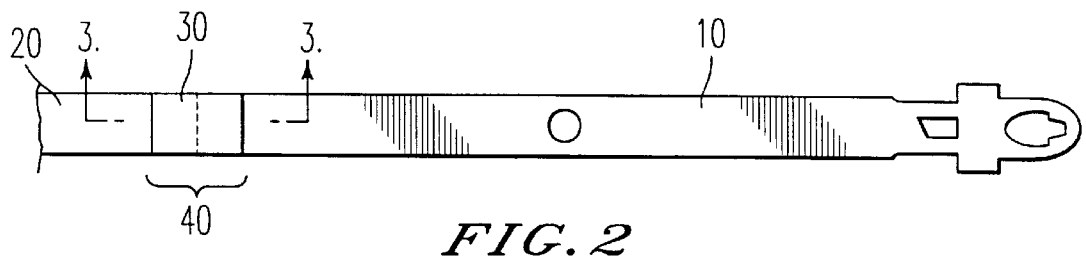
FIG. 2 is a plan view showing a connecting portion of a leader tape.
Figure 3:
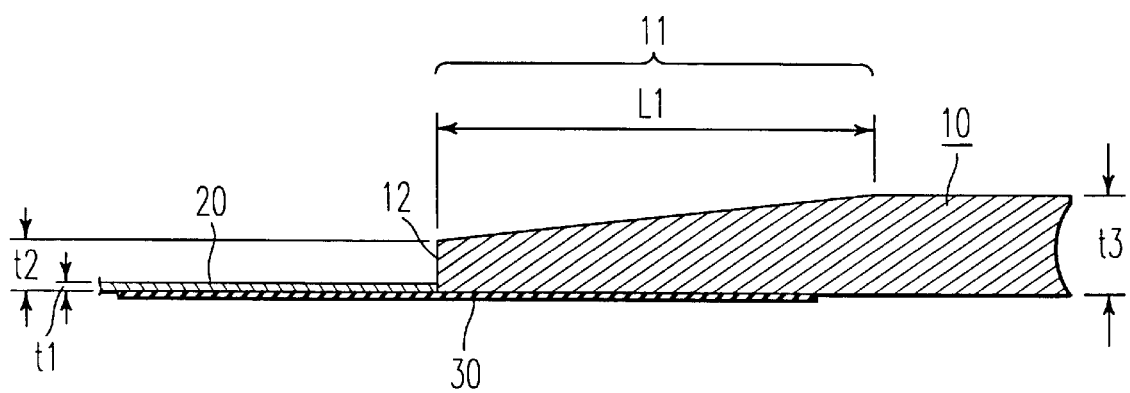
FIG. 3 is an enlarged side view showing a portion indicated by III—III of FIG. 2.
Figure 4:
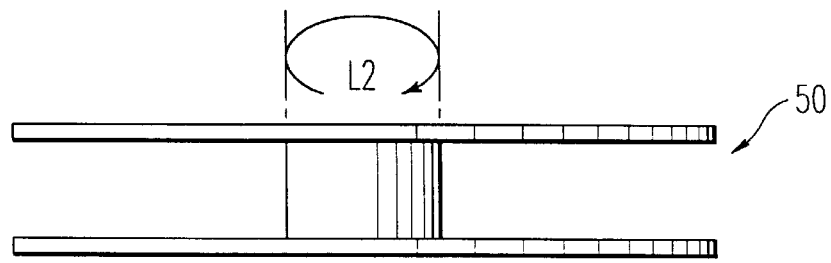
FIG. 4 is a side view of a drive tape reel.

Here, FIG. 1 is an exploded perspective view showing one embodiment of a tape cartridge of the present invention, FIG. 2 is a plan view showing a connecting portion of a leader tape, and FIG. 3 is an enlarged side view showing a portion indicated by III—III of FIG. 2. Similarly, FIG. 4 is a side view of a drive tape reel.

As shown in FIGS. 1 through 3, a tape cartridge 1 according to the present invention comprises a cartridge body 2 including an upper half 2a and a lower half 2b, a thin magnetic tape 20 with its distal end being continuous with a leader tape 10, and a single tape reel 3 having the magnetic tape 20 taken up on it and rotatably received within the cartridge body 2.

The tape reel 3 includes two disc-like reel flanges, namely, an upper flange 3a and a lower flange 3b. A gear portion 5 is formed on an outer periphery of the upper flange 3b.

The upper half 2a is provided with a comb-teeth like engaging portion 6a engage-able with the gear portion 5, and an abutting portion 6b to a releasing element for releasing the engagement between the gear portion 5 and the engaging portion 6a.

The above-mentioned construction is the same as the well known tape cartridges such as, for example, the tape cartridge, etc. disclosed in Japanese Utility Model Laid-Open Publication No.5-36679/1993 and Japanese Utility Model Laid-Open Publication No.5-36680/1993.

In the magnetic tape cartridge 1 according to this embodiment, the thickness t2 of the leader tape 10 at an end edge portion 12 of a connecting portion 11 thereof connected to the magnetic tape 20 is, as shown in FIG. 3, larger than eight times but less than or equal to twenty times, and preferably ten to sixteen times the thickness t1 of the magnetic tape 20.

If the thickness t2 is less than or equal to eight times the thickness t1, the leader tape 10 is reduced in strength and the accuracy of connection with the magnetic tape 20 is lowered, with the results that the running performance of the tape is lowered, and the adhesive agent of a splicing tape 30 is adhered to other part thereby to lower the running performance of the tape, to decrease productivity, and to increase the cost. In contrast, if the thickness t2 is more than 20 times the thickness t1, a difference in thickness between the leader tape 10 and the magnetic tape 20, and a repulsive force generated when the magnetic tape 20 is taken up on the drive reel are increased and a dropout due to transfer significantly occurs.

More specifically, as shown in FIGS. 2 and 3, the leader tape 10 and the magnetic tape 20 are continuous with each other at a continuous portion 40 through a splicing tape 30.

It is preferred that the connecting portion 11 of the leader tape 10 with the magnetic tape 20 is subjected to tapering treatment through etching treatment, abrading treatment, or the like, so as to be tapered in a direction of the thickness of the leader tape 10 as in this embodiment. In other words, the connecting portion 11 of this embodiment is formed by taper-treating one end edge side of the leader tape 10.

The taper treatment is applied to only one surface side of the leader tape 10.

Also, it is preferred that the magnetic tape 20 is thin. For example, the thickness t1 is preferably less than 8.3 μm, and more preferably 4 μm to 8 μm.

If the thickness t1 is in this range, a difference in thickness between the thickness t1 and the thickness t2 of the end edge 12 in the above-mentioned range is reduced and as a result, a step formed on the continuous portion 40 between the leader tape 10 and the magnetic tape 20 is favorably reduced in height.

A length L1 of the connecting portion 11 is more than or equal to a ¼, and more preferably a ½ to 1 length of the minimum circumference L2 (see FIG. 4) of the drive tape reel 50.

If the length L1 is less than a ¼ length of the minimum circumference L2, repulsive force of the leader tape 10 is increased to cause an easy occurrence of a dropout due to transfer at the connecting portion 11. Therefore, the length L1 is preferably more than or equal to ¼ as mentioned.

The expression "minimum circumference" refers to the minimum circumference at that portion (hub) of the drive tape reel 50 where the tape is taken up. The minimum circumference is about 120 mm in the present status.

The magnetic tape 20 employed in this embodiment may be selected from those well known without any particular restriction. Specifically, there can be listed a magnetic tape including a base film, a magnetic layer formed on a top surface of the base film, and a back coated layer formed on a back surface of the base film, and the like. Especially, the base film is preferably a magnetic tape including a base film composed of polyamide.

Material of the leader tape 10 preferably has a high degree of stretching, for example, polyethylene terephthalate (PET) having five or more times of a degree of stretching.

A thickness t3 of the leader tape 10 at its area excluding the connecting portion 11 is preferably 100 μm to 200 μm.

Other members than this, for example, the splicing tape and the tape reel may be formed of ordinary well-known material without any special restriction. For example, material of the tape reel preferably includes GFPC (glass fiber reinforced polycarbonate), PC (polycarbonate), and the like.

Since the tape cartridge 1 of this embodiment is formed in the manner as mentioned above, the leader tape 10 has a sufficient strength, and a transfer of difference in thickness hardly occurs even when the magnetic tape 10 is taken up, while the tape cartridge 1 is in use.

In case the length of the connecting portion 11 is within the above-mentioned range, repulsive force generated, when the magnetic tape is taken up, is small.

It should be noted that the tape cartridge according to the present invention is not limited to the embodiment shown in FIGS. 1 through 4. Various changes and modifications can be made without departing from the gist of the present invention.

For example, the connecting portion 11 may be without being subjected to tapering treatment. Further, the tapering treatment may be applied to opposite side surfaces.

What is claimed is:

1. A tape cartridge comprising:

a cartridge body including an upper half and a lower half, a leader tape, a magnetic tape having a thickness less than 8.3 μm, said magnetic tape having a distal end continuous with the leader tape, and a single tape reel having the magnetic tape taken up thereon and rotatably received within said cartridge body, wherein a thickness of said leader tape at an end edge portion of a connection portion thereof connected to said magnetic tape is larger than eight times, but less than or equal to twenty times, a thickness of said magnetic tape.

2. The tape cartridge according to claim 1, wherein the thickness of said leader tape at the end edge portion of the connection portion thereof connected to said magnetic tape is ten to sixteen times a thickness of said magnetic tape.

3. The tape cartridge according to claim 1, wherein a length of said connecting portion is more than or equal to a ¼ length of the minimum circumference of a drive tape reel.

4. The tape cartridge according to claim 1, wherein a base film of said magnetic tape is formed of polyamide.

5. The tape cartridge according to claim 4, wherein said leader tape is formed of polyethylene terephthalate.

* * * * *